United States Patent
Tanigawa et al.

(10) Patent No.: US 9,590,325 B2
(45) Date of Patent: Mar. 7, 2017

(54) STRUCTURE FOR FIXING BATTERY POST TERMINAL

(71) Applicants: FURUKAWA ELECTRIC CO., LTD., Tokyo (JP); FURUKAWA AUTOMOTIVE SYSTEMS INC., Shiga (JP)

(72) Inventors: Tomoaki Tanigawa, Shiga (JP); Yoshikazu Tanaka, Shiga (JP); Fumitaka Iwasaki, Shiga (JP); Norihito Motosugi, Shiga (JP); Norihito Tsujimoto, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 0 days.

(21) Appl. No.: 14/830,703

(22) Filed: Aug. 19, 2015

(65) Prior Publication Data
US 2015/0357731 A1   Dec. 10, 2015

Related U.S. Application Data

(63) Continuation of application No. PCT/JP2014/054011, filed on Feb. 20, 2014.

(30) Foreign Application Priority Data

Feb. 20, 2013   (JP) ................................. 2013-031542

(51) Int. Cl.
*H01R 4/42*     (2006.01)
*H01R 11/28*    (2006.01)
*H01M 2/30*     (2006.01)

(52) U.S. Cl.
CPC .......... *H01R 11/283* (2013.01); *H01M 2/305* (2013.01)

(58) Field of Classification Search
CPC ............... H01R 11/281–11/283; H01R 11/287
(Continued)

(56) References Cited

U.S. PATENT DOCUMENTS 3,116,100 A * 12/1963 Hunter ................ H01R 11/282
                                                        439/757
5,302,142 A *  4/1994 Tabata ................ H01R 11/283
                                                        439/762
(Continued)

FOREIGN PATENT DOCUMENTS

JP        S6212264        1/1987
JP        H0597056       12/1993
(Continued)

OTHER PUBLICATIONS

International Search Report mailed Apr. 1, 2014 for International Application No. PCT/JP2014/054011, 4 pages.

*Primary Examiner* — Hien Vu
(74) *Attorney, Agent, or Firm* — Amin, Turocy & Watson, LLP

(57) ABSTRACT

A fixing structure includes a battery post terminal having extended portions each having an inclined surface formed thereon, and an electrode fitting part sandwiching, from both sides, side surfaces of a battery post by performing pressing to narrow a space between the extended portions; a slope member having four leg parts each having a slope formed thereon whose inclination angle is the same as that of the inclined surface, and pressing the extended portions by being moved in an up-and-down direction while making the slopes to be brought into contact with the inclined surfaces; and a bolt moving the slope member in the up-and-down direction, in which the four leg parts are disposed with a (Continued)

space provided therebetween along an outer periphery of a screw part, the screw part being set as a center, when the battery post terminal is seen from a vertical direction.

5 Claims, 17 Drawing Sheets

(58) Field of Classification Search
USPC .................................................. 439/762–765
See application file for complete search history.

(56) References Cited

U.S. PATENT DOCUMENTS

| | | | | |
|---|---|---|---|---|
| 5,302,143 A | * | 4/1994 | Inoue | H01R 11/283 |
| | | | | 439/762 |
| 5,454,741 A | * | 10/1995 | Okada | H01R 11/283 |
| | | | | 439/762 |
| 5,547,403 A | * | 8/1996 | Haberstroh | H01R 11/283 |
| | | | | 439/762 |
| 5,584,730 A | * | 12/1996 | Tabata | H01R 11/282 |
| | | | | 439/762 |

FOREIGN PATENT DOCUMENTS

| | | |
|---|---|---|
| JP | H0654205 | 7/1994 |
| JP | H11-26053 | 1/1999 |
| JP | H11-26054 | 1/1999 |
| JP | 2000082455 | 3/2000 |
| JP | 2003151651 | 5/2003 |
| JP | 2004235135 | 8/2004 |
| JP | 2005302505 | 10/2005 |
| JP | 2008243458 | 10/2008 |

\* cited by examiner

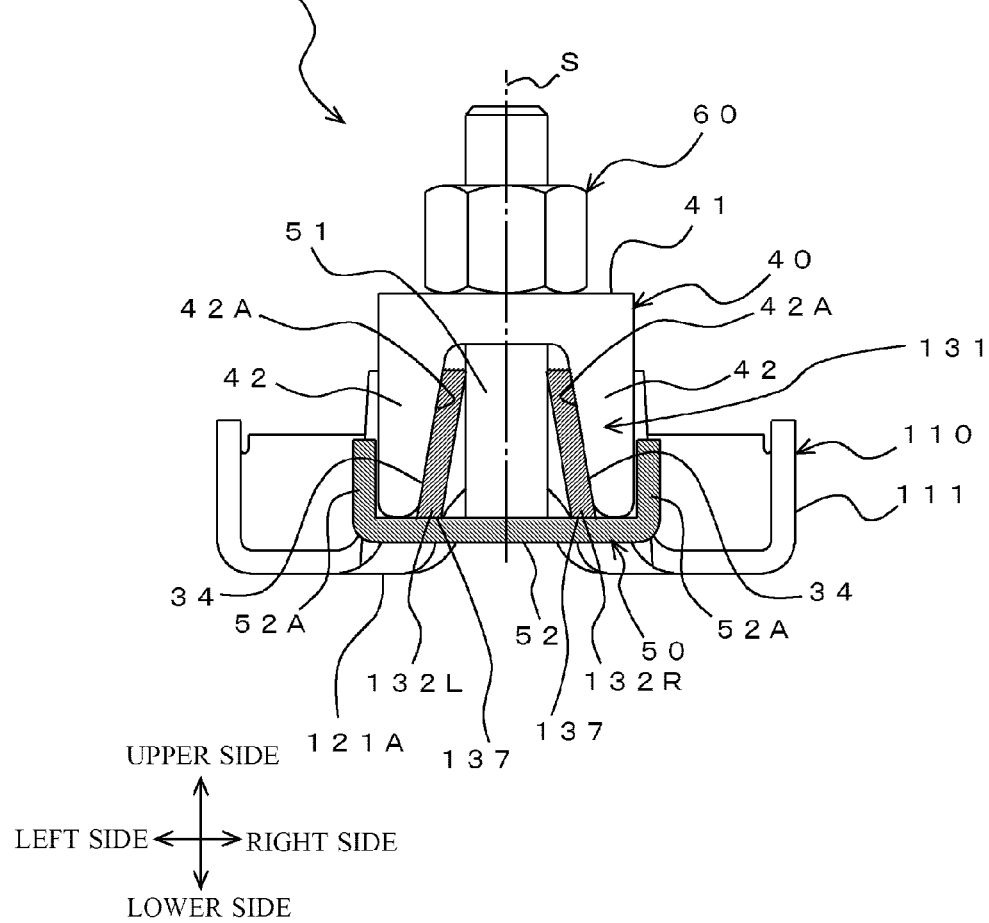

STRUCTURE FOR FIXING BATTERY POST TERMINAL

CROSS-REFERENCE TO RELATED APPLICATIONS

This application is a continuation application of, and claims priority to, International Application No. PCT/JP2014/054011, filed Feb. 20, 2014 and entitled "STRUCTURE FOR FIXING BATTERY POST TERMINAL", which claims priority to Japanese Patent Application No. 2013-031542, filed Feb. 20, 2013, the disclosures of each of which are incorporated herein by reference in their entireties.

TECHNICAL FIELD

The present invention relates to a fixing structure of a battery post terminal for fixing a battery post terminal to a battery post of a battery which is mounted on a vehicle.

BACKGROUND ART

A battery post terminal is fixed to a battery post projecting from an upper surface of a battery mounted on a vehicle such as an automobile, and harnesses for power supply are connected to the battery post terminal. As a structure of fixing the battery post terminal to the battery post, there is one in which side surfaces of the projecting battery post are sandwiched, a bolt is inserted from a lateral direction and fastened to be fixed. However, in the structure in which the bolt is fastened from the lateral direction, it is sometimes difficult to perform the fastening work in an engine room with a large number of parts. Accordingly, a structure capable of making a bolt to be inserted from an up-and-down direction and fastening and fixing the bolt at an upper side of a battery post terminal, is proposed (refer to Patent Documents 1 and 2, for example).

Meanwhile, in recent years, there is a tendency that an electrical component such as a navigation device, electronic control devices of an engine, and the like are added, and a load with respect to a battery becomes large. Further, in order to deal with recent environmental problems, a number of vehicles provided with an idling stop function is also increasing. For this reason, a problem caused by a reduction in a charging rate of a battery is concerned, and it is desired to install a battery status detecting device which monitors a status of the battery. A detection sensor of the battery status detecting device is attached to a battery post terminal.

PRIOR ART DOCUMENT

Patent Document

Patent Document 1: Japanese Laid-open Patent Publication No. H11-26053
Patent Document 2: Japanese Laid-open Patent Publication No. H11-26054

SUMMARY OF THE INVENTION

Problem to be Solved by the Invention

To a detection sensor, a force is applied in various directions due to a vibration or an impact during traveling of a vehicle, and the force is received by a battery post terminal. Accordingly, as a fixing structure of the battery post terminal, one capable of securing a fixing strength in a balanced manner with respect to the force which acts in multi-directions, is desired.

Further, as the fixing structure, it is preferable to employ one in which a bolt is fastened at an upper side, as disclosed in Patent Documents 1 and 2, when a workability of attachment is taken into consideration. Further, the battery post terminal is desirably one having a simple structure requiring little machining of parts, by taking a cost of parts into consideration. However, although the structure of Patent Document 1 described above is a structure in which the bolt is fastened at the upper side, the battery post terminal has a complicated shape requiring bending or the like, so that a simpler structure is desired. Further, in the structures of Patent Documents 1 and 2, the fastening force is made to act from one side, so that it cannot be said that a balance at the time of fastening is good, and it is not possible to secure the fixing strength in a balanced manner with respect to the multi-directions.

The present invention is made in view of the above-described circumstances, and an object thereof is to provide a fixing structure of a battery post terminal capable of receiving, in a balanced manner, a force that acts in multi-directions, and taking a workability of attachment and a cost of parts into consideration.

Means for Solving the Problems

In order to solve the above-described problems, a fixing structure of a battery post terminal of the present invention includes: a battery post terminal having left and right extended portions each having an inclined surface formed thereon, and an electrode fitting part integrally formed with the extended portions, and sandwiching, from both sides, side surfaces of a battery post by performing pressing to narrow a space between the left and right extended portions; a slope member having four leg parts each having a slope formed thereon whose inclination angle is the same as that of the inclined surface, and pressing the left and right extended portions by being moved in an up-and-down direction while making the slopes to be brought into contact with the inclined surfaces; and a bolt having a screw part inserted in the up-and-down direction between the left and right extended portions, and moving the slope member in the up-and-down direction by being fastened, in which the four leg parts are disposed with a space provided therebetween along an outer periphery of the screw part, the screw part being set as a center, when the battery post terminal is seen from a vertical direction.

At this time, it is desirable that, when the battery post terminal is seen from a front, the left and right extended portions, the electrode fitting part, and the leg parts of the slope member are respectively disposed in a bilaterally symmetric manner relative to the bolt to be inserted, and the leg parts of the slope member are disposed in a symmetric manner in a front-and-rear direction relative to the bolt to be inserted.

Further, it is also possible that a boss portion projecting toward a place between the leg parts adjacent to each other is formed on the inclined surface.

Further, it is also possible to configure such that the leg parts bump against a head part of the bolt in a state where the bolt is fastened.

Further, rotation prevention pieces which abut against the slope member at the time of the fastening, may also be provided to the head part of the bolt.

Furthermore, it is also possible to provide a stepped portion against which the head part of the bolt abuts, at a lower side of the extended portions.

Effects of the Invention

In the fixing structure of the battery post terminal according to the present invention, when the screw part of the bolt is set as a center, the four leg parts equally press the left and right extended portions in the state where the bolt is fastened. Accordingly, even when a force acts in multi-directions on the electrode fitting part sandwiching the side surfaces of the battery post to enlarge a space between the left and right extended portions, the force can be received by the four leg parts in a balanced manner.

Further, the screw part of the bolt is inserted in the up-and-down direction, so that a nut can be fastened at an upper side of the battery post terminal. For this reason, a workability of fastening is good.

Further, since it is only required to match the inclination angle of the inclined surface of each of the extended portions and the inclination angle of the slope of the slope member, an amount of machining of parts of the extended portions is small. Accordingly, the battery post terminal can be set to have a simple structure.

BRIEF DESCRIPTION OF DRAWINGS

FIG. 17 is a sectional view taken along C2-C2 in FIG. 15.

MODE FOR CARRYING OUT THE INVENTION (First Embodiment)

Figure 1:
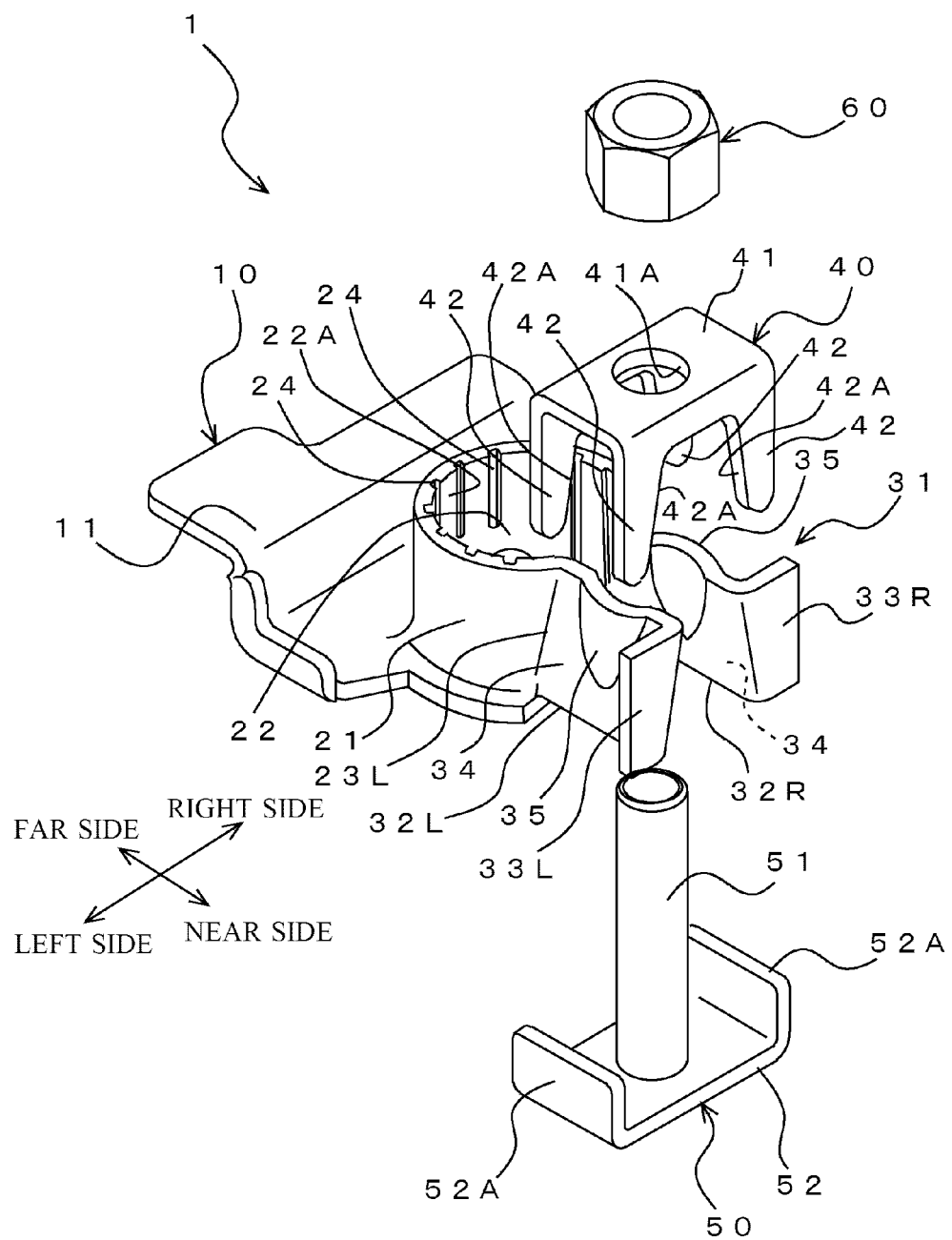
FIG. 1 is an exploded perspective view of a fixing structure of a battery post terminal according to a first embodiment of the present invention.
Figure 2:
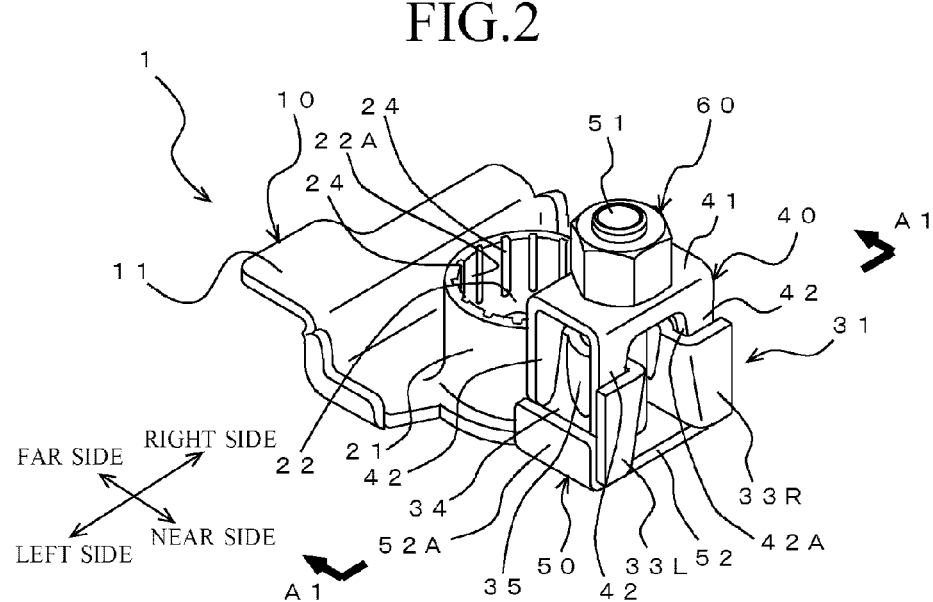
FIG. 2 is a perspective view illustrating a result of assembling respective parts illustrated in FIG. 1, and illustrating a state before a nut is fastened.
Figure 3:
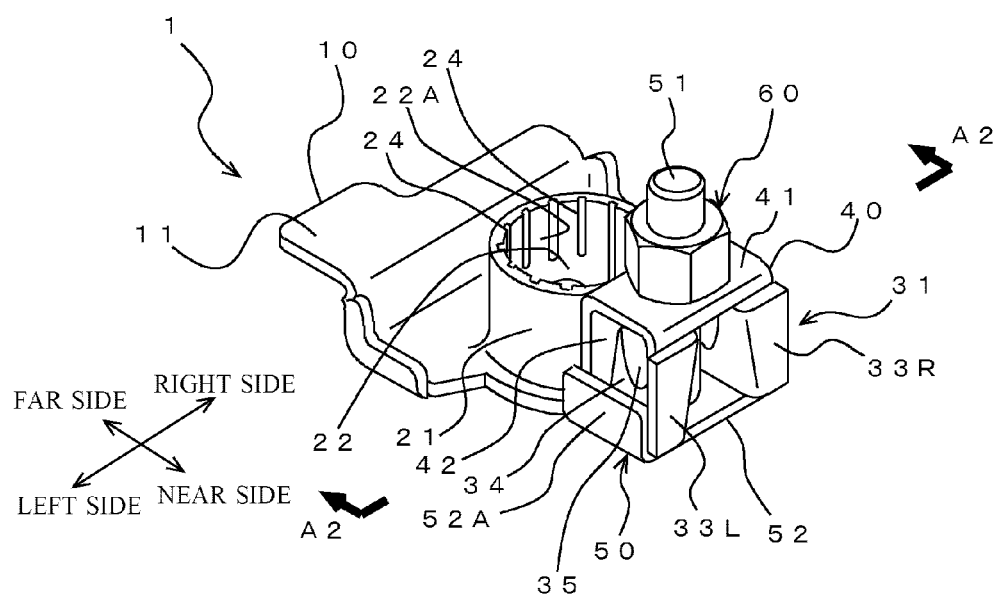
FIG. 3 is a perspective view illustrating a result of assembling the respective parts illustrated in FIG. 1, and illustrating a state after the nut is fastened.
Figure 4:
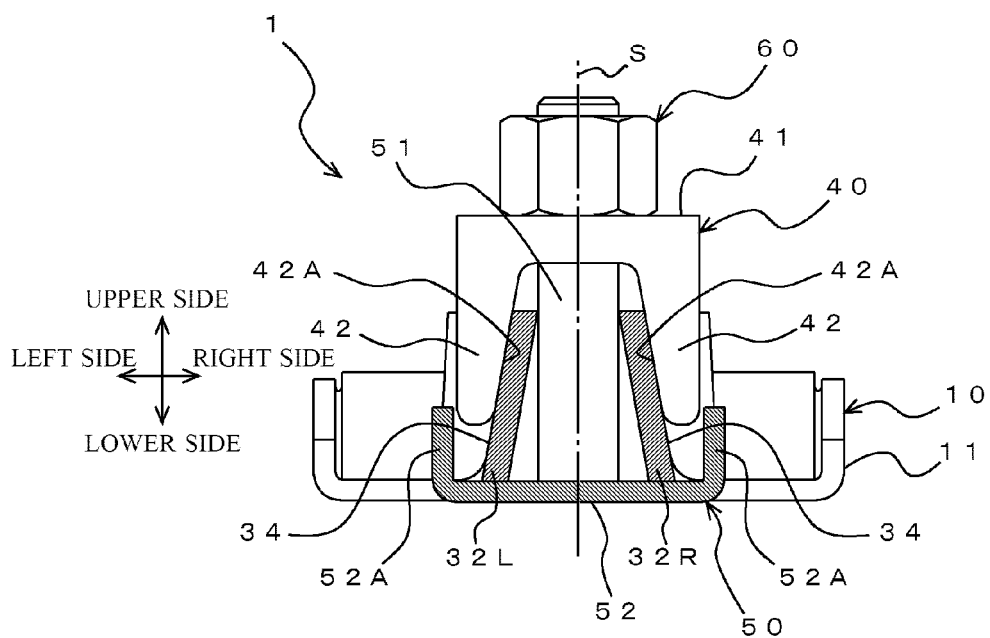
FIG. 4 is a sectional view taken along A1-A1 in FIG. 2, and illustrating a state before the nut is fastened.
Figure 5:
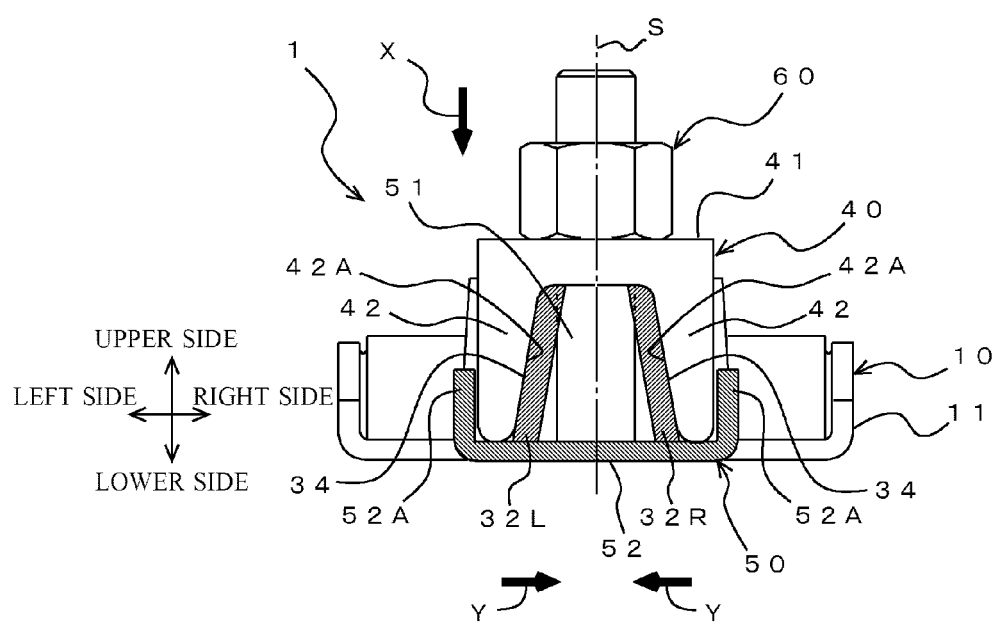
FIG. 5 is a sectional view taken along A2-A2 in FIG. 3, and illustrating a state after the nut is fastened.

Hereinafter, a fixing structure 1 of a battery post terminal according to a first embodiment of the present invention will be described in detail by using the drawings. FIG. 1 is an exploded perspective view of a fixing structure of a battery post terminal. Further, each of FIG. 2 and FIG. 3 is a perspective view illustrating a result of assembling respective parts illustrated in FIG. 1, in which FIG. 2 illustrates a state before a nut is fastened, and FIG. 3 illustrates a state after the nut is fastened. Further, FIG. 4 is a sectional view taken along A1-A1 in FIG. 2, and illustrating a state before the nut is fastened, and FIG. 5 is a sectional view taken along A2-A2 in FIG. 3, and illustrating a state after the nut is fastened. Note that a front-and-rear direction, a left-and-right (horizontal) direction, an up-and-down (vertical) direction, a direction on a near side, and a direction on a far side used in the following description, are set to indicate directions when seen from a front side (near side of the paper in FIG. 4 or FIG. 5).

As illustrated in FIG. 1, the fixing structure 1 of the battery post terminal assembles a battery post terminal 10 and a slope member 40 by fastening them in the up-and-down direction using a bolt 50 and a nut 60.

The battery post terminal 10, made of a metal material having a conductivity, is formed of a connecting part 11 positioned on the far side, an electrode fitting part 21 positioned on the near side with respect to the connecting part 11, and a fixing part 31 positioned further on the near side with respect to the electrode fitting part 21, the parts being integrally formed, as illustrated in FIG. 1 to FIG. 3.

The connecting part 11 is incorporated in a case of a detection sensor (not illustrated) of a battery status detecting device. Harnesses for electrical components are attached in a form of having the detection sensor interposed therebetween. A shape of the connecting part 11 is arbitrarily formed in accordance with an attachment structure in the detection sensor. Further, the connecting part 11 also functions as a structural member that supports the detection sensor.

The electrode fitting part 21 is for fixing the battery post terminal 10 to a battery post (not illustrated). The electrode fitting part 21 is formed in a truncated cone shape in accordance with a shape of the battery post having a truncated cone shape, and at a center of the electrode fitting part 21, a fitting hole 22 penetrating in the up-and-down direction is formed, as illustrated in FIG. 1 to FIG. 3. An inner peripheral surface 22A of the fitting hole 22 is inclined so as to be brought into surface-contact with an inclined outer peripheral surface of the battery post. Further, on the inner peripheral surface 22A of the fitting hole 22, a plurality of grooves 24 are formed with a space provided therebetween in a circumferential direction, thereby increasing a gripping force for sandwiching the outer peripheral surface of the battery post. The electrode fitting part 21 is attached so as to put the fitting hole 22 on the battery post from above the battery post.

Further, the electrode fitting part 21 is continued to the connecting part 11 in an integral manner at a portion on the far side, and has a shape, at a portion on the near side, in which the part is branched (divided) into left and right portions with the fitting hole 22 sandwiched therebetween. The fixing part 31 is formed by being extended to the near side from respective tip portions 23L and 23R being the portions branched into the left and right sides.

As illustrated in FIG. 1, the fixing part 31 is formed of a left-side extended portion 32L extending to the near side from the tip portion 23L on the left side, and a right-side extended portion 32R disposed side by side with the left-side extended portion 32L with a center line S sandwiched therebetween and with a space provided therebetween, and extending to the near side from the tip portion 23R on the right side. Note that the fixing part 31 has a bilaterally symmetric shape relative to the center line S, and accordingly, in the following description, only a structure on the left side of the fixing part 31 will be described, and a structure on the right side of the fixing part 31 will be omitted.

On the left-side extended portion 32L, there is formed an inclined surface 34 which inclines in the upper right direction so as to approach the center line S as tending from a lower side to an upper side, when seen from the near side illustrated in FIG. 4 or FIG. 5. Further, on an upper portion at a center in the front-and-rear direction of the inclined surface 34, a boss portion 35 which is widened in an elliptical shape from the inside to the outside is formed, as illustrated in FIG. 1. As illustrated in FIG. 2 and FIG. 3, a position of the boss portion 35 corresponds to a position at which, in a state where the bolt 50 which will be described later in detail is attached, a screw part 51 of the bolt 50 is inserted. Further, the boss portion 35 is designed to project outward toward a place between leg parts 42 adjacent to each other in the front-and-rear direction, in a state where the later-described slope member 40 is assembled in the fixing part 31, as illustrated in FIG. 2 and FIG. 3.

Further, the left-side extended portion 32L has an elasticity, and is designed to move elastically in the left-and-right direction by setting a portion on the far side of the electrode fitting part 21 as a base end portion. On a tip on the near side of the left-side extended portion 32L, there is formed a folded-back portion 33L bent at a right angle in the left direction. The folded-back portion 33L is bent so that a length in the front-and-rear direction of the inclined surface 34 (a length from the tip portion 23L to the folded-back portion 33L) becomes substantially the same as a length in the front-and-rear direction of the later-described slope member 40.

As illustrated in FIG. 1, the slope member 40 is attached so as to be put on the fixing part 31 of the battery post terminal 10, from above the fixing part 31. The slope member 40 has a top surface part 41 having a substantially quadrangular shape, and four leg parts 42 extending downward from respective four corner portions of the top surface part 41. Regarding lengths of sides of the top surface part 41, the side in the front-and-rear direction is formed to be shorter than the side in the left-and-right direction, as illustrated in FIG. 1. Further, an insertion hole 41A is formed at a center portion of the top surface part 41, and the screw part 51 of the bolt 50 to be described later is inserted into the insertion hole 41A. The four leg parts 42 are disposed in a symmetric manner in the front-and-rear direction and in the left-and-right direction relative to the insertion hole 41A, and a space between the leg parts 42 in the front-and-rear direction is narrower than a space between the leg parts in the left-and-right direction. Further, an upper surface of the top surface part 41 is formed in a flat surface state so that the nut 60 can be stably fastened.

On the inside of each of the left and right four leg parts 42, a slope 42A is formed, as illustrated in FIG. 4 and FIG. 5. The slope 42A is formed to have an inclination angle same as that of the inclined surface 34 of each of the left and right extended portions 32L and 32R, and in a state where the slope member 40 is assembled in the fixing part 31, the inclined surface 34 and the slope 42A are brought into surface-contact with each other.

Lower ends of the four leg parts 42 are designed to be bumped against an upper surface of a head part 52 of the bolt 50 which will be described later in detail, in a state where the nut 60 is completely fastened, as illustrated in FIG. 5. Specifically, lengths of the four leg parts 42 are determined based on a relationship with a fastening torque at a time of fastening the nut 60, and by designing such that the nut 60 is fastened until when the four leg parts 42 bump against the upper surface of the head part 52 of the bolt 50, an excess torque is prevented.

Further, when a state in which the slope member 40 is attached is seen from the vertical direction, the four leg parts 42 of the slope member 40 are disposed with a space provided therebetween along an outer periphery of the screw part 51, the screw part 51 of the bolt 50 being set as a center, and are disposed substantially evenly in a balanced manner so as to surround the outside of the screw part 51.

As illustrated in FIG. 1, the bolt 50 is formed of the screw part 51 extending in the up-and-down direction, and the head part 52 positioned at the lower side of the screw part 51. On each of both left and right ends of the head part 52, a rotation prevention piece 52A which rises upward from the head part 52 is provided. In a state where the bolt 50 is assembled, facing internal surfaces of the rotation prevention pieces 52A are designed to respectively abut against outer lower portions of the slope member 40, as illustrated in FIG. 4 and FIG. 5. This prevents a co-rotation of the bolt 50 in a fastening direction, at a time of fastening the nut 60.

Next, an operation of the fixing structure in the first embodiment of the present invention will be described.

A state before fixing the nut 60 corresponds to a state in which the slope member 40 is put on the fixing part 31, and the slopes 42A of the slope member 40 and the inclined surfaces 34 of the fixing part 31 are brought into surface-contact with each other, as illustrated in FIG. 2 and FIG. 4. Further, the bolt 50 is inserted from the lower side of the fixing part 31, and the screw part 51 passes through a part between the left and right extended portions 32L and 32R (more specifically, a part between the left and right boss portions 35) to be inserted into the insertion hole 41A of the slope member 40, and is temporarily fastened by the nut 60.

A position of the slope member 40 in the left-and-right direction is regulated when the slopes 42A and the inclined surfaces 34 are respectively brought into surface-contact with each other. Further, a position of the slope member 40 in the front-and-rear direction is regulated when outer peripheral surfaces of the slope member 40 in the front-and-rear direction and the folded-back portions 33L and 33R of the fixing part 31 are respectively brought into contact with each other. Further, the position in the front-and-rear direction is regulated also by the internal surfaces of the leg parts 42 in the front-and-rear direction and the boss portions 35. Meanwhile, a position of the bolt 50 is regulated when the outer peripheral surfaces of the slope member 40 in the left-and-right direction and the rotation prevention pieces 52A are brought into contact with each other.

When, from this state, the nut 60 is fastened at an upper side of the slope member 40, the slope member 40 moves in a downward X direction (a fastening direction of the bolt 50, refer to FIG. 5), while being guided by the surface-contacts between the slopes 42A and the inclined surfaces 34 at the left and right sides. Further, the slope 42A presses the inclined surface 34 in an inward Y direction (refer to FIG. 5). Accordingly, the left and right extended portions 32L and 32R are elastically deformed in the inward Y directions so that a space provided therebetween in the left-and-right direction becomes narrow, and the battery post in the fitting hole 22 of the electrode fitting part 21 is fastened to be fixed.

At this time, the inclined surface 34 and the slope 42A press each of the extended portions 32L and 32R while being brought into surface-contact with each other, so that there is no chance that the extended portions 32L and 32R are twisted by the pressing force. Accordingly, the fastening force of the nut 60 is stably transmitted to the extended portions 32L and 32R, resulting in that the extended portions 32L and 32R are pressed in a balanced manner.

Further, when the battery post terminal 10 is seen from the vertical direction, the four leg parts 42 are disposed with a space provided therebetween along the outer periphery of the screw part 51, the screw part 51 of the bolt 50 being set as a center, and are disposed substantially evenly in a balanced manner so as to surround the outside of the screw part 51. Accordingly, the four leg parts 42 press the left and right extended portions 32L and 32R in the inward Y directions with a substantially equal force. Accordingly, even if a force acts, from multi-directions, on the screw part 51 after fastening the bolt 50 and the nut 60, it becomes possible to secure a fixing strength which is equal to every direction.

With the use of the fixing structure 1 of the battery post terminal according to the first embodiment of the present invention, when the battery post terminal 10 is seen from the vertical direction, the four leg parts 42 are disposed with a space provided therebetween along the outer periphery of the screw part 51, the screw part 51 being set as a center. Accordingly, the four leg parts 42 equally press the left and right extended portions 32L and 32R by setting the screw part 51 of the bolt 50 as a center, in the state where the nut 60 is fastened. For this reason, even if a force acts, in multi-directions, on the electrode fitting part 21 sandwiching the side surfaces of the battery post to enlarge the space between the left and right extended portions 32L and 32R, the force can be received by the four leg parts 42 in a balanced manner.

Further, the screw part 51 of the bolt 50 is inserted in the up-and-down direction, so that the nut 60 can be fastened at the upper side of the battery post terminal 10. Accordingly, the workability is good since the work of fixing the battery post terminal 10 to the battery post can be conducted at the upper side of the battery post terminal 10.

Further, since it is only required to match the inclination angle of the inclined surface 34 of each of the extended portions 32L and 32R and the inclination angle of the slope 42A of the slope member 40, only a small amount of machining of parts of the extended portions 32L and 32R is required. Accordingly, the battery post terminal 10 can be set to have a simple structure.

Further, when the battery post terminal 10 is seen from the front, the left and right extended portions 32L and 32R, the electrode fitting part 21, and the four leg parts 42 of the slope member 40 are respectively disposed in a bilaterally symmetric manner relative to the screw part 51 of the bolt 50 to be inserted, so that the fastening force of fastening the nut 60 can be made to act on the left and right extended portions 32L and 32R and the electrode fitting part 21 equally in a balanced manner. Further, since the four leg parts 42 are disposed in a symmetric manner in the front-and-rear direction relative to the screw part 51, a balance of fastening in the front-and-rear direction is also good. For this reason, it becomes possible to achieve the fixing strength which is stable in the front-and-rear direction and in the left-and-right direction. Further, the respective inclined surfaces 34 of the left and right extended portions 32L and 32R are inclined so as to be directed toward the outside in the left-and-right direction as tending from the upper side to the lower side, corresponding to a moving direction of the slope member 40, so that with the use of the two leg parts 42 on the front side and the two leg parts 42 on the rear side, the extended portions 32L and 32R can be moved horizontally and inwardly with the same fastening force.

Further, in the slope member 40, the space between the leg parts 42 in the front-and-rear direction is set to be narrower than the space between the leg parts in the left-and-right direction (the member is disposed in a rectangular shape), so that a bias of force that acts on the leg parts on the front side and the rear side becomes small. Specifically, regarding a force that acts on the extended portions 32L and 32R, a force that acts on the leg parts 42 on the front side becomes larger than a force that acts on the leg parts 42 on the rear side, as a distribution of the force with respect to the leg parts 42 on the front and rear sides, and a bias in the distributed force on the front and rear sides becomes smaller as the space between the leg parts 42 on the front and rear sides is reduced. Accordingly, by narrowing the space, it becomes possible that the four leg parts 42 can receive the force in a balanced manner.

Further, on each of the inclined surfaces 34, the boss portion 35 projecting toward the place between the leg parts 42 adjacent to each other is formed, so that by disposing the slope member 40 by sandwiching each of the boss portions 35 between the leg parts 42, it is possible to easily conduct a positioning of the slope member 40. Further, when the nut 60 is fastened, the leg parts 42 and the boss portions 35 abut against each other, resulting in that the slope member 40 can be prevented from being co-rotated together with the nut 60. Further, it is possible to increase the rigidity of the extended portions 32L and 32R.

Further, since it is designed such that in the state where the nut 60 is fastened, the leg parts 42 bump against the upper surface of the head part 52 of the bolt 50, when a worker fastens the nut 60, it is possible to output a predetermined fastening torque only by fastening the nut 60 until when the leg parts 42 bump against the head part of the bolt 50. For this reason, it is possible to prevent the excess torque, and further, there is no chance that the fastening torque varies depending on workers. Besides, since it is easy to control the torque, the workability is improved.

Furthermore, on the head part 52 of the bolt 50, the rotation prevention pieces 52A which abut against the slope member 40 at the time of fastening the nut 60 are formed, so that when the slope member 40 and the rotation prevention pieces 52A abut against each other, it is possible to prevent the bolt 50 from being co-rotated together with the nut 60. Further, when the nut 60 is fastened, the leg parts 42 which abut against the upper surface of the head part 52 of the bolt 50 are prevented from being deformed in the left-and-right direction by the fastening force.

The fixing structure 1 of the battery post terminal according to the first embodiment of the present invention is described above, and the present invention is not limited to the already-described embodiment, and various modifications and changes can be made based on the technical idea of the present invention.

For example, in the first embodiment, it is designed such that the bolt 50 is inserted from the lower side to the upper side, and the nut 60 is fastened at the upper side of the bolt 50, but, it is also possible to configure such that the nut and the bolt are made to be placed upside down. For example, it is designed such that the nut is fixed at the lower side by welding or the like, the bolt is inserted from the upper side, and the bolt is fastened. With this structure, it is also possible to insert the bolt in the up-and-down direction, and the worker can perform the fastening work at the upper side of the battery post terminal 10.

Further, in the first embodiment, although the slope member 40 is attached so as to be put on the extended portions 32L and 32R from above the extended portions, it is also possible to design such that the slope member 40 is attached from the lower side of the extended portions 32L and 32R, and the slope member is pulled upward. In this case, it is only required to form each of the inclined surfaces 34 of the extended portions 32L and 32R, and the slopes 42A of the slope member 40 by inverting the inclination in the up-and-down direction. Also in this structure, it is possible to receive the force that acts in multi-directions in a balanced manner.

(Second Embodiment)

Figure 6:
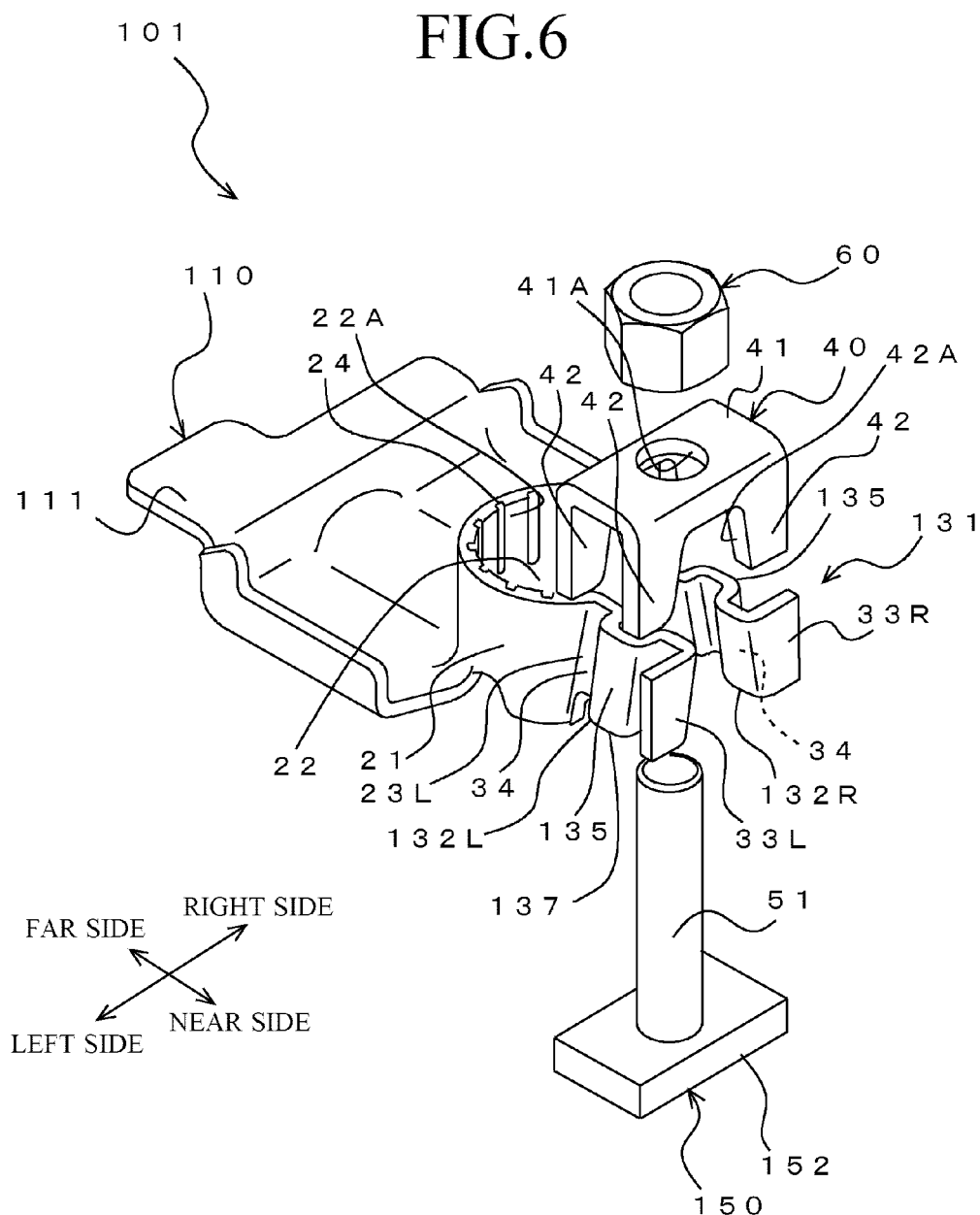
FIG. 6 is an exploded perspective view of a fixing structure of a battery post terminal according to a second embodiment of the present invention.
Figure 7:
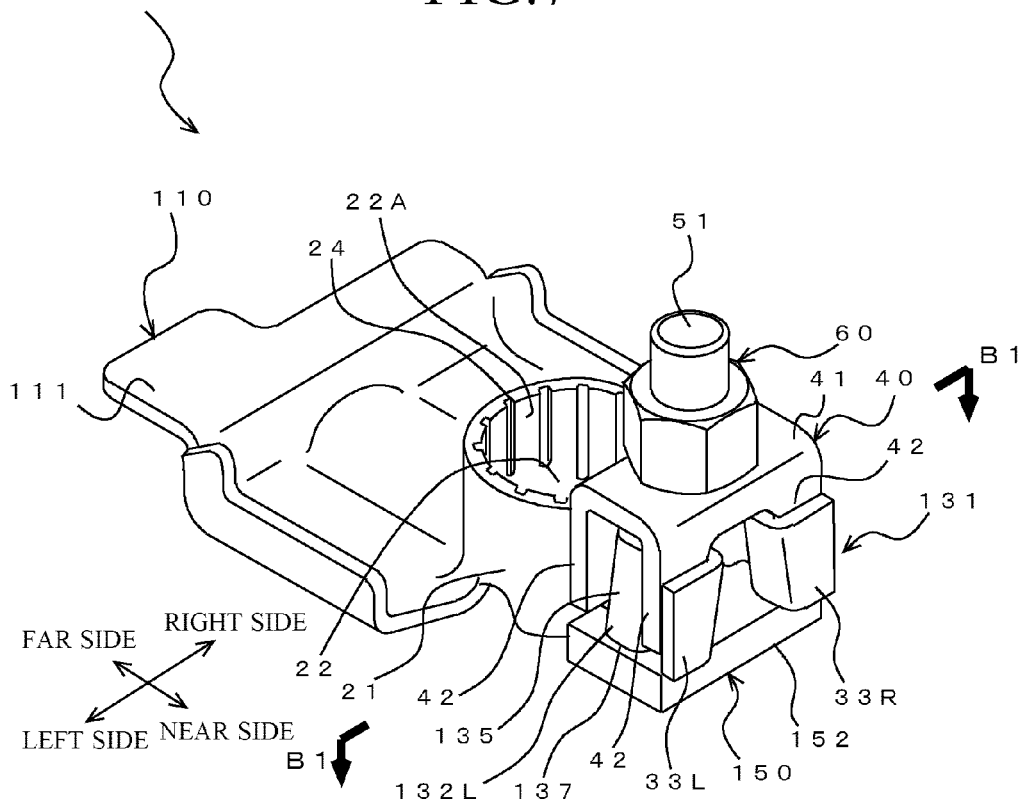
FIG. 7 is a perspective view illustrating a result of assembling respective parts illustrated in FIG. 6, and illustrating a state before a nut is fastened.
Figure 8:
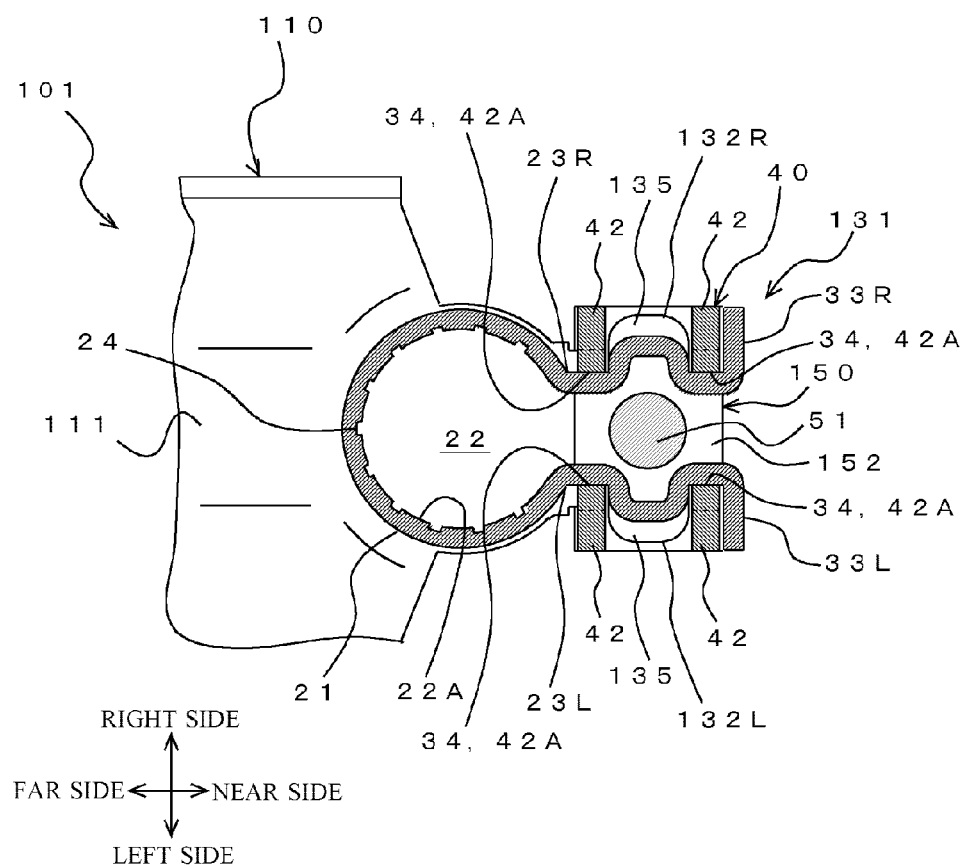
FIG. 8 is a sectional view taken along B1-B1 in FIG. 7.

Hereinafter, a fixing structure 101 of a battery post terminal according to a second embodiment of the present invention will be described in detail by using the drawings. FIG. 6 is an exploded perspective view of a fixing structure of a battery post terminal according to the second embodiment of the present invention. FIG. 7 is a perspective view illustrating a result of assembling respective parts illustrated in FIG. 6, and illustrating a state after a nut is fastened. Further, FIG. 8 is a sectional view taken along B1-B1 in FIG. 7, and FIG. 9 corresponds to a side view of FIG. 7, and illustrates a state before the nut is fastened. Note that a front-and-rear direction, a left-and-right (horizontal) direction, an up-and-down (vertical) direction, a direction on a near side, and a direction on a far side used in the following description, are set to indicate directions when seen from a front side (right side of the paper in FIG. 8 or FIG. 9).

Further, in the following description, only a structure different from the structure described in the first embodiment will be described, and detailed explanation of the same structure will be omitted by giving the same reference numerals in the description or the drawings.

As illustrated in FIG. 1, the fixing structure 101 of the battery post terminal assembles a battery post terminal 110 and the slope member 40 by fastening them in the up-and-down direction using a bolt 150 and the nut 60.

As illustrated in FIG. 6 to FIG. 9, the battery post terminal 110 is formed of a connecting part 111 positioned on the far side, the electrode fitting part 21 positioned on the near side with respect to the connecting part 111, and a fixing part 131 positioned further on the near side with respect to the electrode fitting part 21, the parts being integrally formed.

Although the connecting part 111 is formed to have a length in a depth direction which is longer than that of the first embodiment, a function thereof to supply power by being incorporated in a case of a detection sensor (not illustrated), and a function thereof as a structural member for supporting the detection sensor, are the same as those of the first embodiment.

Figure 9:
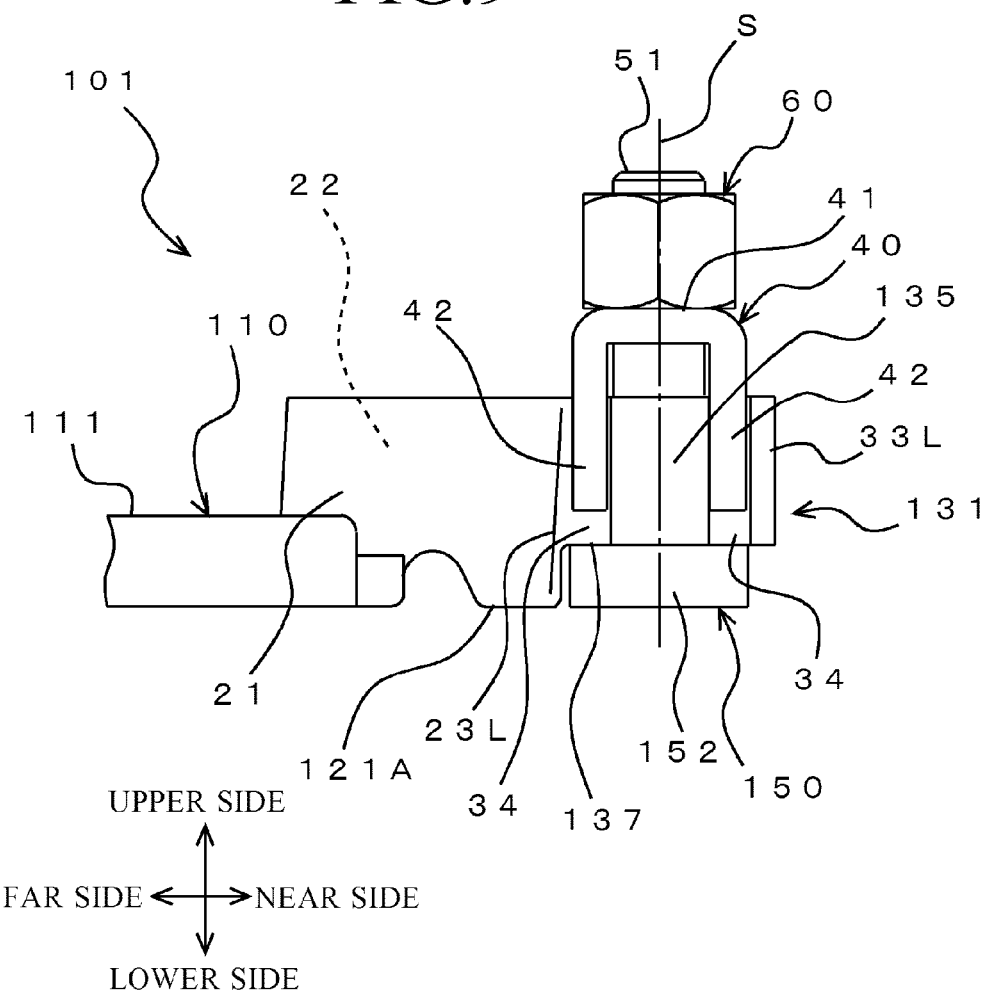
FIG. 9 is a view corresponding to a side view of FIG. 7, and illustrating a state before the nut is fastened.

The fixing part 131 is formed of a left-side extended portion 132L and a right-side extended portion 132R extending to the near side from the tip portions 23L and 23R, respectively, branched into left and right sides of the electrode fitting part 21. At a lower side of these left-side extended portion 132L and right-side extended portion 132R, there is formed a stepped portion 137 cut-out toward the upper side with respect to a lower surface 121A of the electrode fitting part 21 (refer to FIG. 9). The stepped portion 137 is formed along the entire length in the front-and-rear direction of the left-side extended portion 132L and the right-side extended portion 132R, as illustrated in FIG. 9, and has a shape enabling the entire head part 152 of the bolt 150 which will be described later in detail to enter the stepped portion 137.

Further, on the inclined surface 34 of each of the left-side extended portion 132L and the right-side extended portion 132R, a boss portion 135 which continues from an upper end to a lower end of each of the inclined surfaces in the up-and-down direction is formed.

As illustrated in FIG. 6, the bolt 150 is formed of the screw part 51 and the head part 152. When compared to the head part 52 of the first embodiment, the head part 152 is not provided with the rotation prevention pieces 52A. However, it is designed such that, when the bolt 150 is fastened, the head part 152 enters the above-described stepped portion 137, and a front side surface of the head part 152 abuts against a side surface of the stepped portion 137 (a side surface at the lower side of the electrode fitting part 21), which prevents a co-rotation of the bolt 150, as illustrated in FIG. 9.

With the use of the fixing structure 101 of the battery post terminal according to the second embodiment of the present invention, since the stepped portion 137 at which the electrode fitting part 21 and the head part 152 of the bolt 150 abut against each other, is provided to the left and right extended portions 132L and 132R, it is possible to prevent the bolt from being co-rotated in the fastening direction, at the time of fastening the bolt. Accordingly, there is no need to provide the rotation prevention pieces 52A to the head part 152 of the bolt 150, resulting in that the bolt 150 can be set to have a simple structure.

Further, since the boss portion 135 continues in the up-and-down direction from the upper end to the lower end of the inclined surface 34, it is used for performing positioning of the slope member 40, and can guide the slope member 40 in the up-and-down direction along the entire length along which the slope member 40 moves in the up-and-down direction.

The fixing structure 101 of the battery post terminal according to the second embodiment of the present invention is described above, and the present invention is not limited to the already-described embodiment, and various modifications and changes can be made based on the technical idea of the present invention.

Figure 10:
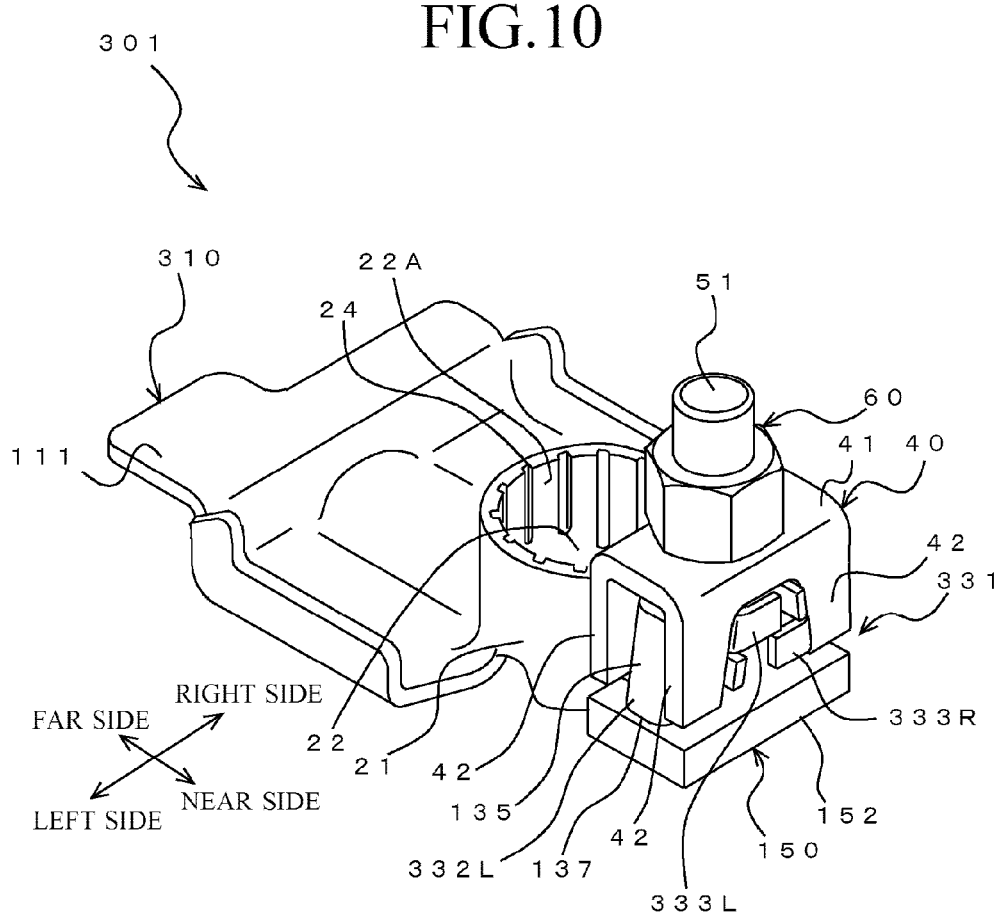
FIG. 10 is a perspective view illustrating a modified example of the second embodiment, and illustrating a state before a nut is fastened.
Figure 11:
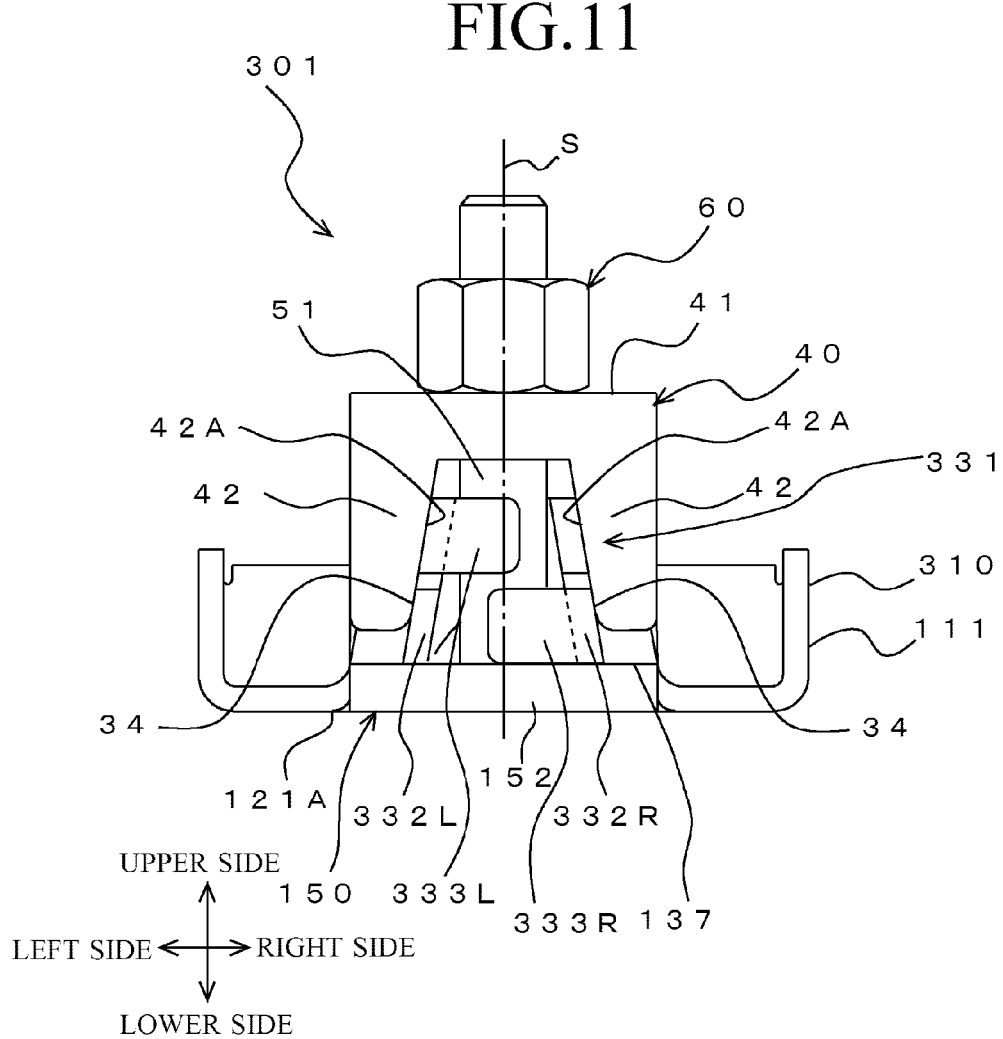
FIG. 11 is a front view of FIG. 10.
Figure 12:
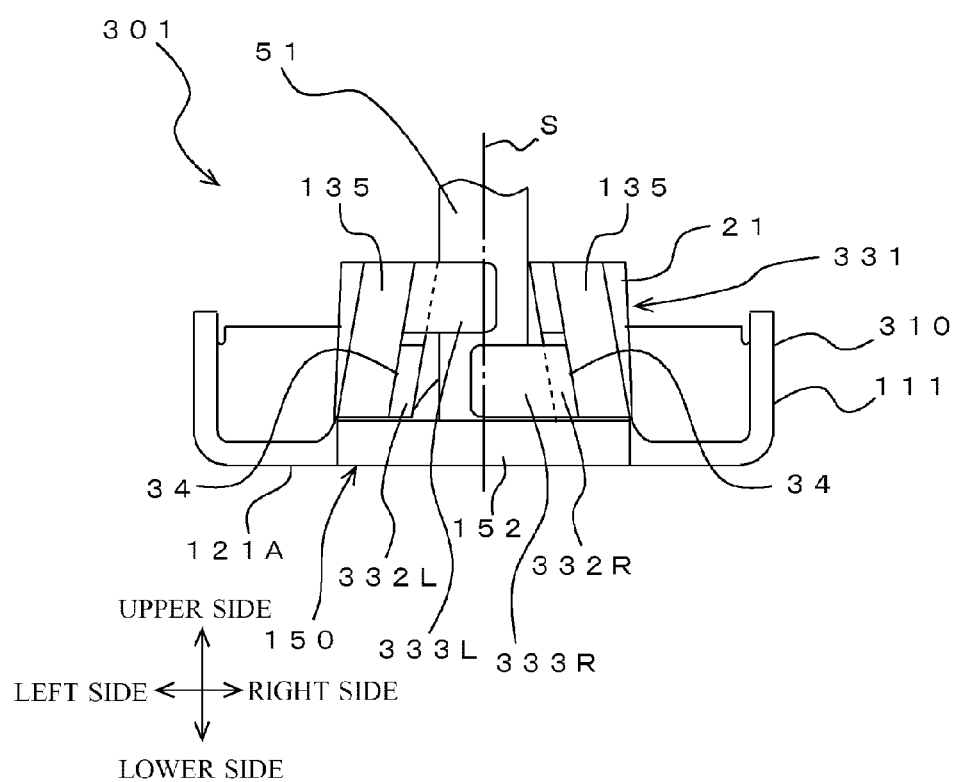
FIG. 12 is a front view illustrating a state where a slope member and the nut are omitted from FIG. 11.
Figure 13:
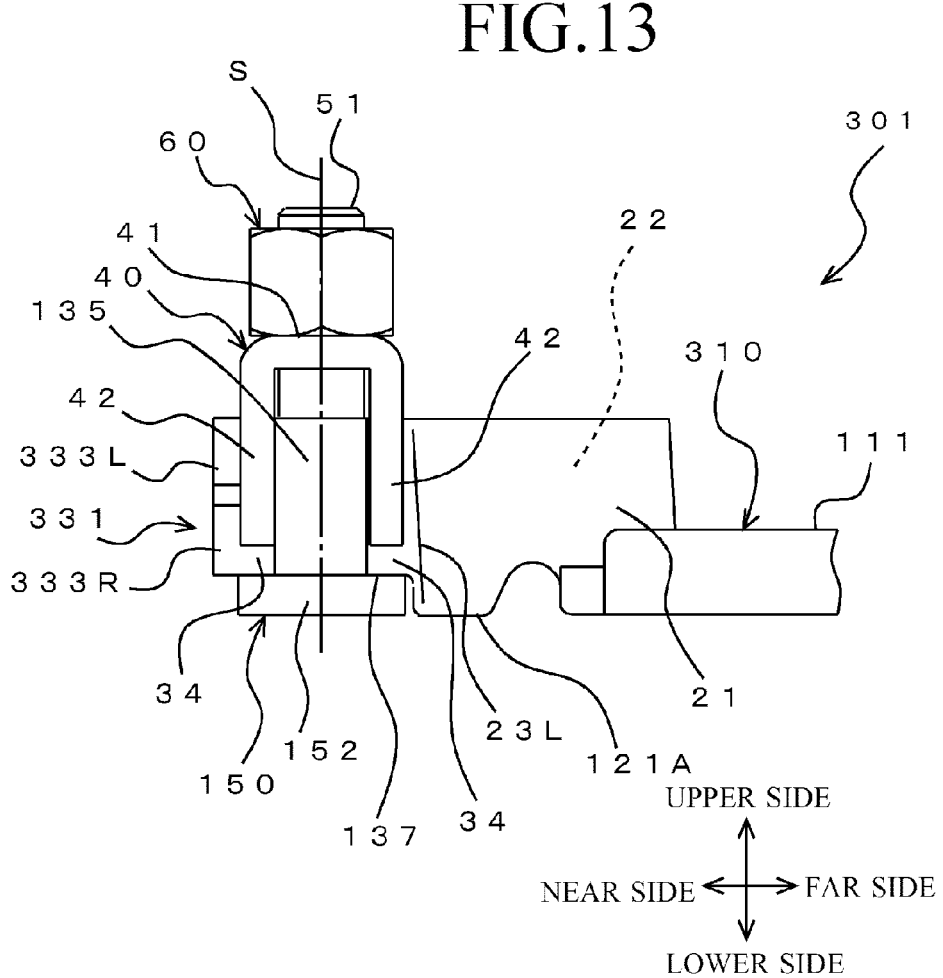
FIG. 13 is a right side view of FIG. 10.

FIG. 10 is a perspective view illustrating a modified example of the second embodiment, and illustrating a state before a nut is fastened. Further, FIG. 11 is a front view of FIG. 10, FIG. 12 is a front view illustrating a state where a slope member and the nut are omitted from FIG. 11, and FIG. 13 is a right side view of FIG. 10. Note that detailed explanation of the structure same as that of the second embodiment will be omitted by giving the same reference numerals in the description or the drawings.

In the above-described second embodiment, the folded-back portions 33L and 33R positioned at the tip portions on the near side of the extended portions 132L and 132R of the battery post terminal 110 are folded back in the left and right outer directions, respectively. However, in a fixing structure 301 of a battery post terminal in a modified example of the second embodiment, it is configured such that folded-back portions 333L and 333R are folded back in the left and right inner directions, at tips of extended portions 332L and 332R.

As illustrated in FIG. 10 to FIG. 12, the folded-back portion 333L on the left side is formed by folding back an upper side of a tip portion of the extended portion 332L on the left side in the inner direction. Meanwhile, the folded-back portion 333R on the right side is formed by folding back a lower side of a tip portion of the extended portion 332R on the right side in the inner side, and the left and right folded-back portions 333L and 333R are formed by providing a space therebetween in the up-and-down direction so as not to interfere with each other. A fixing part 331 has a structure in which the left and right extended portions 332L and 332R are bilaterally symmetric relative to the center line S, except for the left and right folded-back portions 333L and 333R (refer to mainly FIG. 12).

By folding back the respective left and right folded-back portions 333L and 333R inwardly, a battery post terminal 310 (the entire extended portions, in particular) can be set to have an outer shape which is as flat as possible. Accordingly, when a plurality of battery post terminals 310 are put in a plating tank to be plated, the folded-back portions 333L and 333R are not tangled with another battery post terminal 310, resulting in that the plating work can be efficiently conducted.

Note that when the slope member 40 is assembled, the positioning of the slope member 40 in the front-and-rear direction is conducted by making the internal surfaces of the leg parts 42 abut against the boss portions 135 provided to the inclined surfaces 34 of the extended portions 332L and 332R.

(Third Embodiment)

Figure 14:
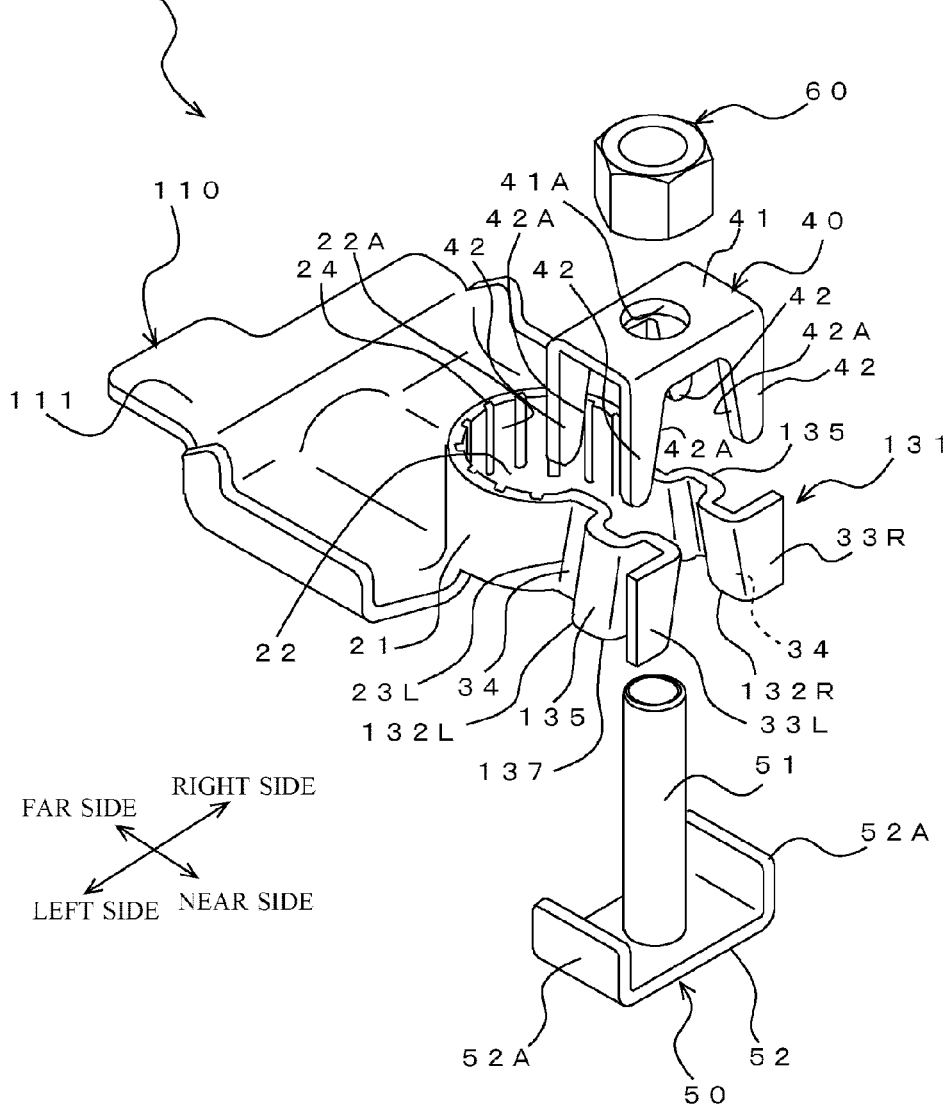
FIG. 14 is an exploded perspective view of a fixing structure of a battery post terminal according to a third embodiment of the present invention.
Figure 15:
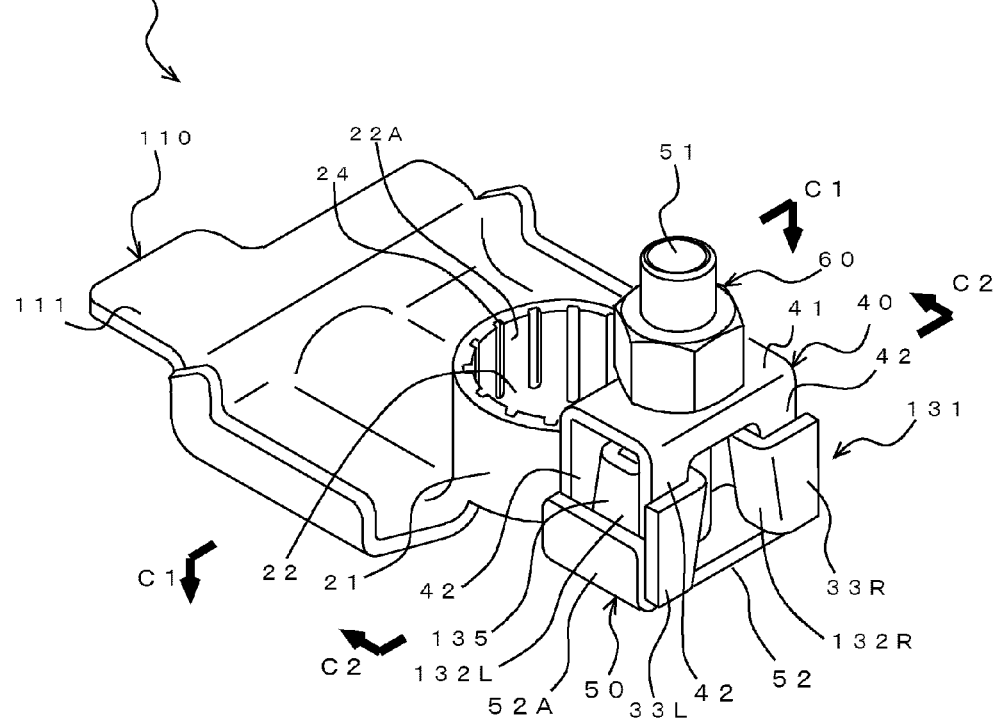
FIG. 15 is a perspective view illustrating a result of assembling respective parts illustrated in FIG. 14, and illustrating a state after a nut is fastened.
Figure 16:
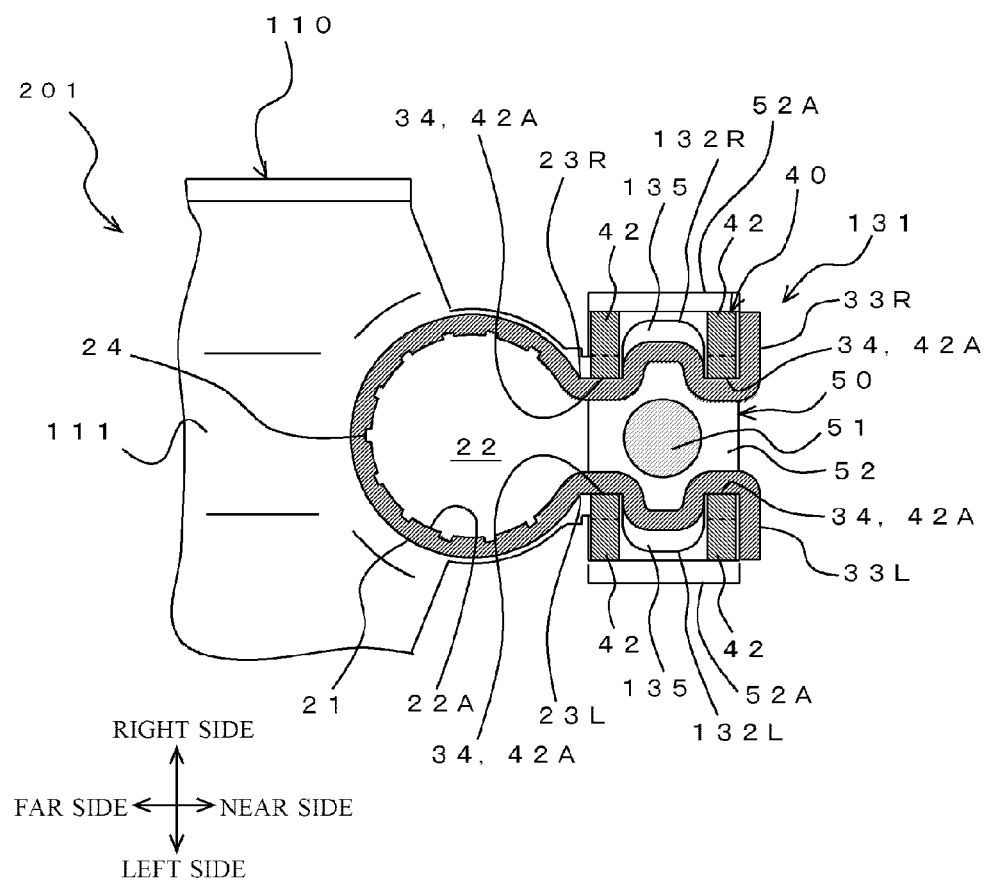
FIG. 16 is a sectional view taken along C1-C1 in FIG. 15.

Hereinafter, a fixing structure 101 of a battery post terminal according to a third embodiment of the present invention will be described in detail by using the drawings. FIG. 14 is an exploded perspective view of a fixing structure of a battery post terminal according to the third embodiment of the present invention. FIG. 15 is a perspective view illustrating a result of assembling respective parts illustrated in FIG. 14, and illustrating a state after a nut is fastened. Further, FIG. 16 is a sectional view taken along C1-C1 in FIG. 15, and FIG. 17 is a sectional view taken along C2-C2 in FIG. 15. Note that a front-and-rear direction, a left-and-right (horizontal) direction, an up-and-down (vertical) direction, a direction on a near side, and a direction on a far side used in the following description, are set to indicate directions when seen from a front side (near side of the paper in FIG. 17).

Further, structures same as those of the first embodiment and the second embodiment are denoted by the same reference numerals in the description or the drawings.

The configuration of the second embodiment in which the bolt 50 of the first embodiment is used, corresponds to the third embodiment. For this reason, in the following description, only a part of the bolt 50 will be described, and detailed description regarding the other structure will be omitted.

On the battery post terminal 110 used in a fixing structure 201 of a battery post terminal, the stepped portion 137 described in the second embodiment is formed, as illustrated in FIG. 14 and FIG. 17. The head part 52 of the bolt 50 enters the stepped portion 137, and the front side surface of the head part 52 abuts against the side surface of the stepped portion 137 (the side surface at the lower side of the electrode fitting part 21), which prevents the bolt 50 from being co-rotated. Further, it is designed such that the left and right rotation prevention pieces 52A of the head part 52 respectively abut against the outer lower portions of the slope member 40 in the state of being assembled. This also prevents the bolt 50 from being co-rotated in the fastening direction at the time of fastening the nut 60.

With the use of the fixing structure 201 of the battery post terminal according to the third embodiment of the present invention, since it is configured such that the co-rotation of the bolt 50 is prevented by three points of the stepped portion 137 and the rotation prevention pieces 52A, it is possible to perform the fastening work more securely and easily, when compared to the configuration of the second embodiment.

The fixing structure 201 of the battery post terminal according to the third embodiment of the present invention is described above, and the present invention is not limited to the already-described embodiment, and various modifications and changes can be made based on the technical idea of the present invention.

For example, it is also possible to design such that, as described in the modified example of the second embodiment, the folded-back portions 333L and 333R are formed to be folded back in the left and right inner directions, to prevent a plurality of battery post terminals from being tangled when plating is conducted in a plating tank.

EXPLANATION OF THE REFERENCE NUMERALS 1, 101, 201, 301 Fixing structure of battery post terminal
10, 110 Battery post terminal
11, 111 Connecting part
21 Electrode fitting part
22 Fitting hole
22A Inner peripheral surface
23L, 23R Tip portion
24 Groove
31, 131, 331 Fixing part
32L, 132L, 332L Left-side extended portion
32R, 132R, 332R Right-side extended portion
33L, 33R, 333L, 333R Folded-back portion
34 Inclined surface
35, 135 Boss portion
40 Slope member
41 Top surface part
41A Insertion hole
42 Leg part
42A Slope
50, 150 Bolt
51 Screw part
52, 152 Head part
52A Rotation prevention piece
60 Nut
121A Lower surface of electrode fitting part
137 Stepped portion
S Center line
X, Y Direction

The invention claimed is:

1. A fixing structure of a battery post terminal, comprising:
a battery post terminal having left and right extended portions each having an inclined surface formed thereon, and an electrode fitting part integrally formed with the left and right extended portions, and sandwiching, from both sides, side surfaces of a battery post by performing pressing to narrow a space between the left and right extended portions;
a slope member having four leg parts each having a slope formed thereon whose inclination angle is the same as that of the inclined surface, and pressing the left and fight extended portions by being moved in an up-and-down direction while making the slopes to be brought into contact with the inclined surfaces; and
a bolt having a screw part inserted in the up-and-down direction between the left and right extended portions, and moving said slope member in the up-and-down direction by being fastened, wherein the four leg parts are disposed with a space provided therebetween along an outer periphery of the screw part, the screw part being set as a center, when said battery post terminal is seen from a vertical direction, the bolt is inserted from a bottom of a fixing part of the battery post and a nut is placed at a top of the fixing part, and at least one of left and right folded-back portions connected to the left and right extended portions is folded inwardly from the left and right extended portions, wherein a boss portion projecting toward a place between the leg parts adjacent to each other is formed on the inclined surface, wherein the boss portion has a curved shape that surrounds the screw part, and wherein the curved shape helps a user to insert the bolt along with the boss portion.

2. The fixing structure of the battery post terminal according to claim 1, wherein
when said battery post terminal is seen from a front, the left and right extended portions, the electrode fitting part, and the leg parts of said slope member are respectively disposed in a bilaterally symmetric manner relative to said bolt, and the leg parts of said slope member are disposed in a symmetric manner in a front-and-rear direction relative to said bolt.

3. The fixing structure of the battery post terminal according to claim 1, wherein
rotation prevention pieces which abut against said slope member at the time of the fastening, are provided to the head part of said bolt.

4. The fixing structure of the battery post terminal according to claim 1, wherein
a stepped portion against which a head part of said bolt abuts, is provided at a lower side of the extended portions.

5. The fixing structure of the battery post terminal according to claim 1, wherein the boss portion continues in the up-and-down direction from an upper end to a lower end of the inclined surface.

* * * * *